(12) United States Patent
Koike et al.

(10) Patent No.: US 6,853,426 B2
(45) Date of Patent: Feb. 8, 2005

(54) METHOD FOR MANUFACTURING LIQUID CRYSTAL DISPLAY

(75) Inventors: Yasuo Koike, Yokohama (JP); Hayami Tabira, Yokohama (JP); Takashi Inoue, Yokohama (JP); Hirotaka Imayama, Mobara (JP); Masateru Morimoto, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/022,331

(22) Filed: Dec. 20, 2001

(65) Prior Publication Data

US 2002/0131000 A1 Sep. 19, 2002

(30) Foreign Application Priority Data

Mar. 14, 2001 (JP) ........................................ 2001-072591
Sep. 27, 2001 (JP) ........................................ 2001-295396

(51) Int. Cl.$^7$ .......................................... G02F 1/1337
(52) U.S. Cl. ........................................ 349/126; 349/123
(58) Field of Search ................................ 349/126, 123, 349/124

(56) References Cited

U.S. PATENT DOCUMENTS 5,571,852 A * 11/1996 Afzali-Ardakani et al. . 523/215

FOREIGN PATENT DOCUMENTS

| JP | 2-275926 | | 11/1990 |
|---|---|---|---|
| JP | 04-250423 | * | 9/1992 |
| JP | 4-333824 | | 11/1992 |
| JP | 05-107543 | * | 4/1993 |
| JP | 5-181139 | | 7/1993 |
| JP | 05-264997 | | 10/1993 |
| JP | 6-194664 | | 7/1994 |
| JP | 07-261179 | * | 10/1995 |
| JP | 8-334767 | | 12/1996 |
| JP | 11-014994 | * | 1/1999 |
| JP | 11-258609 | * | 9/1999 |

* cited by examiner

Primary Examiner—Tarifur R. Chowdhury
Assistant Examiner—Thoi V. Duong
(74) Attorney, Agent, or Firm—Antonelli, Terry, Stout & Kraus, LLP

(57) ABSTRACT

The present invention materializes a liquid-crystal display element and a liquid-crystal display device which promise superior display performance, in which the surface of an alignment film formed on a substrate member has been subjected to rubbing in the state the surface potential of a rubbing roller has been controlled by bringing a charge control member made to have the same potential as the potential of the substrate member into contact with the rubbing roller, to keep any foreign matter from adhering to the alignment film surface.

2 Claims, 7 Drawing Sheets

FIG.6
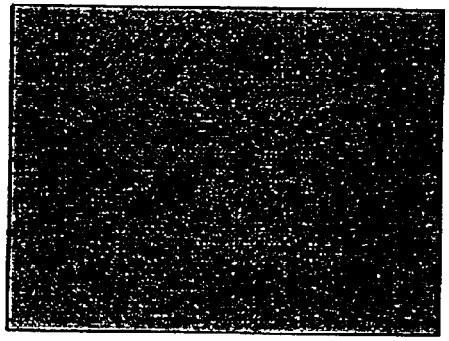 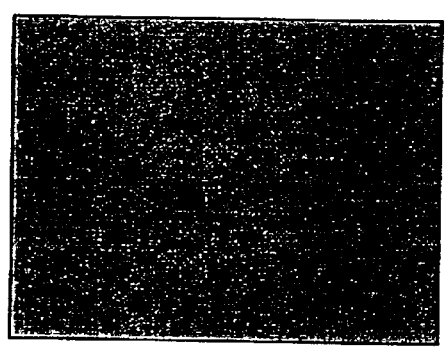
AREA α    AREA β
0.1mm
OPTICAL-MICROPHOTOGRAPH IMAGE
OF FOREIGN MATTER HAVING ADHERED

METHOD FOR MANUFACTURING LIQUID CRYSTAL DISPLAY

This application is based on Japanese Patent Applications No. 2001-072951 and No. 2001-295396 filed in Japan, the contents of which are incorporated hereinto by reference.

BACKGROUND OF THE INVENTION

1. Field of the Invention

This invention relates to a method of, and an apparatus for, manufacturing a liquid-crystal display element, and more particularly, a liquid-crystal display element (panel) manufacturing method and apparatus which are designed to control surface potential in the step of rubbing an alignment film.

2. Description of the Related Art

Liquid-crystal display elements (panels) are widely used for display screens of portable-type personal computers and so forth. In recent years, they are demanded to have high quality such as high resolution, high contrast ratios and wide viewing angle. In particular, liquid-crystal display elements making use of a thin-film transistor (TFT) type active matrix (TFT-LCD) have performance comparable to conventional cathode-ray tubes in respect of picture quality. Also, liquid-crystal display elements are superior to cathode-ray tubes in respect of power consumption and space saving. Hence, in replacement of cathode-ray tubes, liquid-crystal display elements are often used in monitors for personal computers.

A process of manufacturing a liquid-crystal display element is briefly described below taking the case of a conventional manufacturing process for a transmission amorphous-silicon (a-Si) type color TFT-LCD. TFT-LCD manufacturing steps consist basically of a TFT formation step of fabricating thin-film transistors, metal wirings and so forth on a glass substrate, a color-filter formation step of fabricating color filters on another glass substrate, and an LCD assembly step of infilling liquid crystal to a space formed by setting these two resultant substrate members face to face.

In the TFT formation step, a series of steps of film formation, resist coating, exposure/development, etching, resist stripping and cleaning are repeated several times on gate wiring, interlaminar insulating film, a-Si film, pixel electrodes, protective film and so forth. Thus, a TFT substrate member is completed, which is then sent to the color-filter formation step.

In the color-filter formation step, after a black matrix has been formed, a series of steps of film formation, resist coating, exposure/development, etching, resist stripping and cleaning are repeated in regard to the three red, green and blue colors. After the three red, green and blue colors have been patterned, an over coat layer is further formed thereon to make the surface have a flatness. A transparent electrode film is finally formed, and then the color-filter substrate member obtained is sent to the LCD assembly step.

A common LCD assembly step for liquid-crystal display elements is outlined with reference to FIG. 1. An assembly step shown here is a step described keeping in mind an LCD assembly step for the a-Si type color TFT-LCD. Other transmission liquid-crystal display elements, reflection liquid-crystal display elements and projection liquid-crystal display elements are also passed through substantially the like LCD assembly step.

The TFT substrate member and the color-filter substrate member which have been formed as described above are sent to the LCD assembly step to carry out steps (substeps) of:

a surface cleaning step (S101) of cleaning the substrate member surface before an alignment film is printed thereon;

an alignment film printing step (S102) of printing an alignment film on the substrate member surface;

an alignment film baking step (S103) of baking the alignment film printed;

an alignment film surface rubbing step (S104) of rubbing the surface of the alignment film baked;

a post-rubbing cleaning step (S105) of cleaning the surface of the alignment film after rubbing;

a sealant patterning step (S106) of applying a sealant on the peripheral portions of the substrate members to make preparation for the formation of a liquid-crystal filling space between opposing substrate members;

a substrate-superposing step (S107) of forming the liquid-crystal filling space by superposing the color-filter substrate member on the TFT substrate member;

a liquid-crystal injection step (S108) of injecting a liquid crystal into the liquid-crystal filling space;

a liquid-crystal sealing step (S109) of closing an injection opening to enclose the liquid crystal hermetically in the filling space; and a lighting inspection step (110) of lighting the TFT-LCD panel assembled, to make inspection. The TFT-LCD panel having been inspected by lighting is sent to a mounting step of mounting integrated circuits for driving and so forth.

In the step S104 rubbing process among the LCD assembly substeps, the alignment film formed on the TFT substrate member or on the color-filter substrate member is rubbed with a cloth in one direction (subjected to "rubbing") to make treatment, in order to align liquid-crystal molecules orderly. As a result of this treatment, liquid-crystal molecules are arranged in the direction of rubbing treatment. Hence, the display performance and display quality of liquid-crystal display element depend greatly on the rubbing treatment.

In the rubbing treatment, a cylindrical roller around which a rubbing cloth such as nylon, Rayon or cotton cloth is kept attached is used. When the alignment film is subjected to rubbing, because of mechanical friction between the alignment film and the rubbing cloth the alignment film may partly come off, or the rubbing cloth fiber may partly be cut or may wear. In such a case, static electricity is generated upon friction at the same time the rubbing cloth fiber wears or is cut. As the result, wear pieces or cut pieces of the rubbing cloth fiber may adhere as foreign matter to the surface of the substrate member having been subjected to rubbing.

Such foreign matter eliminates the liquid crystal coated on the alignment film or disorders the alignment of liquid-crystal molecules to cause faulty display in pixels, and hence it must surely be removed. In order to remove the foreign matter, the surface of the substrate member is cleaned also after the rubbing. However, it is impossible to perfectly remove the foreign matter having adhered. The reason therefor is that the foreign matter having been removed may again adhere in the cleaning step subsequent to the rubbing.

In making the rubbing treatment of the substrate member, not only the alignment film but also the protective film and electrodes formed beneath the alignment film are simultaneously rubbed. The alignment film, the protective film and the electrodes individually have different coefficient of friction against the rubbing cloth, and hence the condition of wear of the rubbing cloth, the condition of adhesion of the foreign matter, the condition of electrification, and so forth also differ for each substance being rubbed.

To sum up the above problems, what must be settled is firstly the generation of static electricity at the time of rubbing, secondly the occurrence of foreign matter originating from the rubbing cloth at the time of rubbing, and thirdly the foreign matter again adhering to the substrate member in the post-rubbing cleaning step. Also, without limitation to the transmission a-Si type TFT-LCD described previously, these problems are likewise included in other transmission liquid-crystal display elements, reflection liquid-crystal display elements and projection liquid-crystal display elements.

To solve such problems, the following methods are proposed as disclosed in Japanese Patent Applications Laid-open No. 2-275926, No. 4-333824, No. 5-181139, No. 6-194664 and No. 8-334767.

In the disclosure of Japanese Patent Application Laid-open No. 2-275926, an apparatus which eliminates the static electricity generated by rubbing, is proposed, in which a rubbing roller is endowed with conductivity by using a rubbing cloth formed of a conductive material and using a conductive-material adhesive and at the same time the rubbing cloth is grounded via a resistor. By using this apparatus, any insulation breakdown of alignment film because of static charging caused by rubbing and any accumulation of static electricity can be kept from occurring. In this apparatus, however, it is impossible to keep the foreign matter from being caused by the wear of the rubbing cloth.

In the disclosure of Japanese Patent Application Laid-open No. 4-333824, a method is proposed in which a protective layer is provided on a substrate member having not been rubbing-treated, at this side of the end portion of an alignment film in its rubbing direction so that any foreign matter can be avoided adhering to the alignment film. This is a method of removing the foreign matter by bringing a substance other than the alignment film into contact with a rubbing cloth to make the substance catch the foreign matter adhering to the rubbing cloth. However, although the foreign matter adhering to the rubbing cloth can be removed at the position where the alignment film has not been rubbing-treated, its effect does extend up to the vicinity where the alignment film has been rubbing-treated.

In addition, its effect can not be expected as the effect of resetting the rubbing cloth at the position where the alignment film has not been started being subjected to rubbing, because the rubbing distance on the substrate member becomes longer as the substrate of a liquid-crystal display panel has a larger size. Also, in this method, too, it is impossible to keep the foreign matter from being caused by the wear of the rubbing cloth.

In the disclosure of Japanese Patent Application Laid-open No. 5-181139, a method is proposed in which a panel substrate member and a clean dummy substrate member are alternately subjected to rubbing so that the foreign matter originating from the alignment film, having adhered to the rubbing cloth, is drawn to adhere to the dummy substrate member to keep the coefficient of friction of the rubbing cloth from changing, to achieve uniform and stable alignment performance without regard to the number of alignment films to be treated. This method, however, is a method of removing the foreign matter originating from the alignment film, and is not a method of removing the foreign matter originating from the rubbing cloth. It is also impossible to keep the foreign matter from being caused by the wear of the rubbing cloth.

In the disclosure of Japanese Patent Application Laid-open No. 6-194664, a method is proposed in which a rubbing cloth worked into a cylinder is stretched over a pair of rollers, and a charge-eliminating unit and a clean unit are provided on the way between them to remove the foreign matter from the rubbing cloth. This method, however, also can not avoid the foreign matter being caused by the wear of the rubbing cloth.

In the disclosure of Japanese Patent Application Laid-open No. 8-334767, a method is proposed in which a blade for removing any adhering foreign matter or a roller coated with a sticky adhesive is brought into contact with a rubbing roller being rotated, to remove the foreign matter from the rubbing cloth. However, the foreign matter may scatter when the foreign matter is scraped off by the blade, or the sticky adhesive may adhere to the roller, and hence the foreign matter can not be avoided adhering to the substrate member.

As discussed above, when the alignment film is subjected to rubbing, the foreign matter is caused by the wear of the rubbing cloth and alignment film, and at the same time the static electricity is generated upon friction. By the action of this static electricity, the foreign matter (wear pieces and/or cut pieces) may adhere to the surface of the substrate member having been subjected to rubbing. In the conventional technique, in order to remove the foreign matter, a cleaning step is added after the rubbing so as to make the foreign matter less remain, but any satisfactory effect has not necessarily been obtained. For example, when the substrate member is cleaned in such a post-rubbing cleaning step, there is a problem that any foreign matter having adhered to areas outside the display region of the liquid-crystal display element may move to an area inside the display region, and again adhere to the alignment film surface (transfer and re-adhesion of foreign matter). Once any foreign matter has adhered to the surface of the alignment film having been subjected to rubbing treatment, the foreign matter disorders the arrangement of liquid-crystal molecules, so that non-uniform display is observed in the dynamic operating inspection carried out after the injection and sealing of liquid crystal.

Accordingly, the post-rubbing cleaning step may be omitted so that the foreign matter produced in the post-rubbing cleaning step can be stopped from adhering again. This, however, brings about a great difficulty, and it is not easy to omit the post-rubbing cleaning step. For example, there may arise problems that the foreign matter having adhered at the time of rubbing remains on the alignment film surface inside the liquid-crystal display region to cause faulty display, that any contamination due to ionic substances may occur when the alignment film is formed by coating and rubbing-treated, which also causes deterioration of display performance, and that the sealant is not well patterned in the sealant patterning step.

SUMMARY OF THE INVENTION

The present invention was made in order to solve the problems on display performance and display quality of the liquid-crystal display element. Accordingly, an object of the present invention is to provide a rubbing method which can keep any foreign matter from being brought from materials constituting the substrate member to be treated and being caused by the wear of the rubbing cloth, and also can prevent the foreign matter from adhering and adhering again or transferring to the alignment film surface; and a liquid-crystal display element manufacturing method and apparatus making use of such a rubbing method.

As discussed previously, conventional techniques have had problems in the rubbing step and post-rubbing cleaning step. The problems are firstly that the foreign matter adheres in the rubbing step, and secondly that the foreign matter having adhered in the rubbing step adheres again or transfer to the alignment film surface in the display region to cause deterioration of display quality. The method and means shown below can solve these problems. That is, in the present invention, in a liquid-crystal display element manufacturing method (process) having a rubbing step, the rubbing step comprises controlling the surface potential of a rubbing roller to control a frictional force acting between a rubbing cloth and a substrate member, and further to control the potential of the substrate member to be subjected to rubbing and the quantity of foreign matter adhering to the substrate.

In the present invention, the surface potential of the rubbing roller may be controlled by bringing a potential control member into contact with the rubbing roller surface. For example, a potential control member covered with a material capable of being contact-charged to a polarity different from the potential of the substrate member surface having the alignment film to be subjected to rubbing is brought into contact with the rubbing roller surface to control the surface potential of the rubbing roller.

Then, in the present invention, a first controller for measuring the surface potential is disposed in the vicinity of the substrate member surface, the surface potential of the substrate member is measured with this controller, and the surface potential of the rubbing roller is controlled in accordance with the information obtained by measurement. Here, the surface potential of the rubbing roller may be controlled by means of a second controller disposed in the vicinity of the rubbing roller surface.

The method described above can keep any foreign matter from being brought from materials constituting the substrate member to be treated and being caused by the wear of the rubbing cloth, and also can prevent the foreign matter from adhering and adhering again or transferring to the alignment film surface. This enables manufacture of a liquid-crystal display element and a liquid-crystal display device which have superior display quality.

BRIEF DESCRIPTION OF THE DRAWINGS

These and other features, objects and advantages of the present invention will become more apparent from the following description when taken in conjunction with the accompanying drawings wherein:

FIG. 6 is an optical-microphotograph image showing foreign matter on the substrate member in Example 1;

DESCRIPTION OF THE PREFERRED EMBODIMENTS

On the substrate surface of the transmission a-Si type TFT-LCD, various materials such as an alignment film (polyimide; hereinafter often "PI"), a transparent electrode (indium oxide-tin oxide; hereinafter often "ITO") and a passivation film (silicon nitride; hereinafter often "SiN") exist simultaneously. In the rubbing step, these materials are inevitably rubbed with a rubbing cloth at the same time. However, it has been found that as shown in FIG. 2 the behavior of friction against the cloth differs depending on the respective materials.

Figure 1:
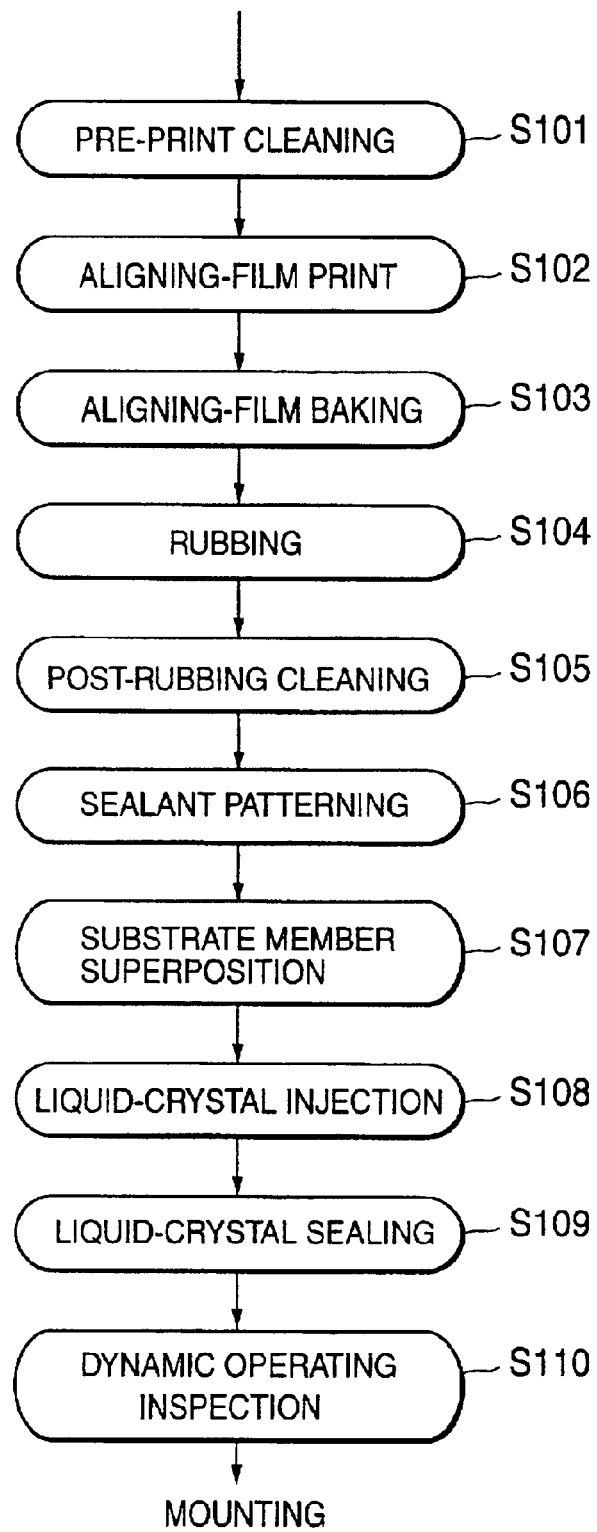
FIG. 1 is a process flow chart for describing the steps of assembling a liquid-crystal display element.
Figure 2:
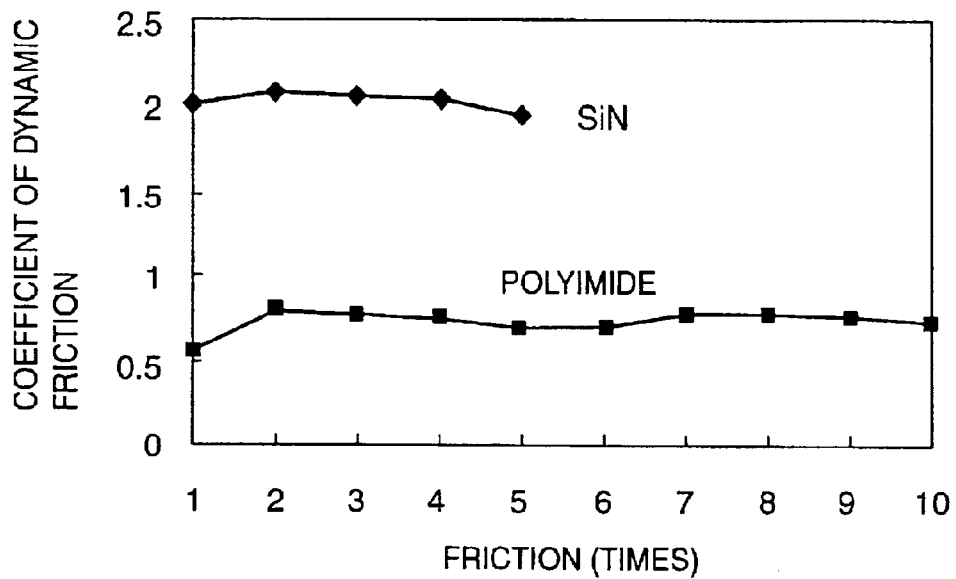
FIG. 2 is a graph for describing changes in the coefficient of dynamic friction at the time of the rubbing with a rubbing cloth.
Figure 3:
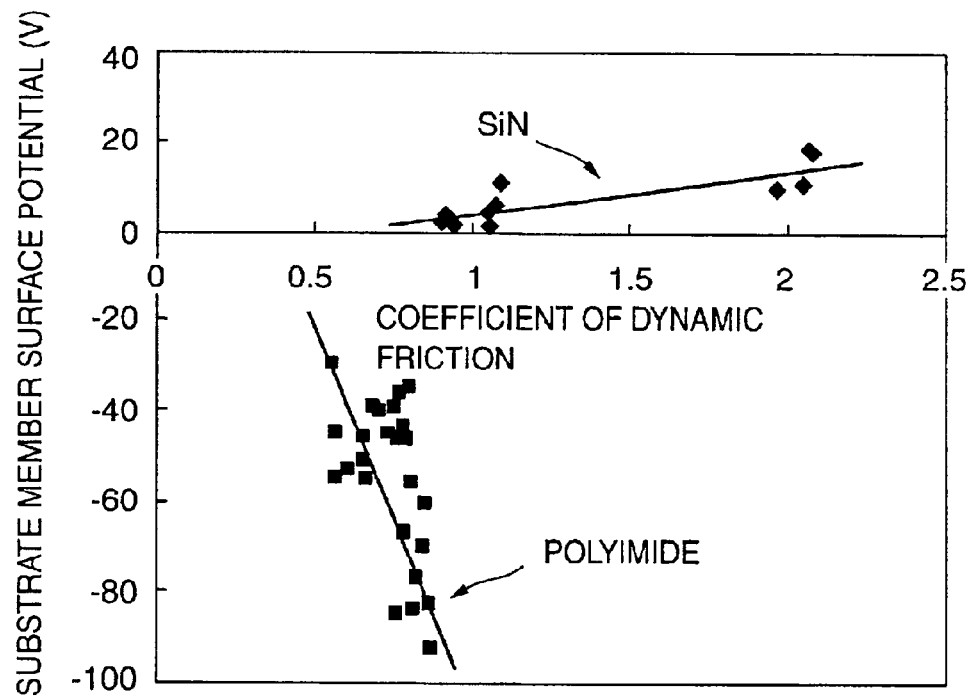
FIG. 3 is a graph for describing the relationship between the coefficient of dynamic friction and the substrate member surface potential at the time of the rubbing with a rubbing cloth.

FIG. 2 is a graph showing changes in the number of times of friction and the coefficient of dynamic friction in regard to the alignment film formed of PI (SE7492, Nissan Chemical Industries, LTD.) and the passivation film formed of SiN. Rayon cloth (YA-19R, Yoshikawa Chemical Co., LTD.) is used in the rubbing cloth. The coefficient of friction is measured with a surface property measuring machine TRIBOGEAR TYPE 14DR, manufactured by Shinto Sceientific Co., Ltd. In the case of PI, the coefficient of dynamic friction increases a little upon friction made once, and is at substantially a constant value thereafter. On the other hand, in the case of SiN, the coefficient of dynamic friction is at substantially a constant value from the beginning. Also, as a result of the measuring of triboelectric potential simultaneously with the measuring of the coefficient of dynamic friction, it has been discovered, as shown in FIG. 3, that there is positive correlation between the value of coefficient of dynamic friction and the absolute value of triboelectric potential as measured on the basis of the ground. It has also been ascertained that, when rubbed with the rubbing cloth, the PI is negatively charged and the SiN is positively charged, that is, the charge polarities of PI and SiN to the cloth as measured on the basis of the ground are opposite to each other. Hereinafter, the polarity or potential is defined to be the polarity or potential as measured on the basis of the ground.

That is, the coefficient of dynamic friction decreases with a decrease in the quantity of triboelectricity. Accordingly, it follows that the level of wear of the cloth and substrate member constituent materials during the rubbing, in other words, the quantity of foreign matter caused by wear can be controlled. It also follows that the reduction of the quantity of triboelectricity makes smaller the static attraction between the foreign matter and the substrate member, so that the foreign matter may adhere to the substrate member with difficulty.

A first example of the present invention which is based on this principle is described below with reference to the accompanying drawings.

EXAMPLE 1

To begin with, the first example is described with reference to FIGS. 4 to 6.

Figure 4:
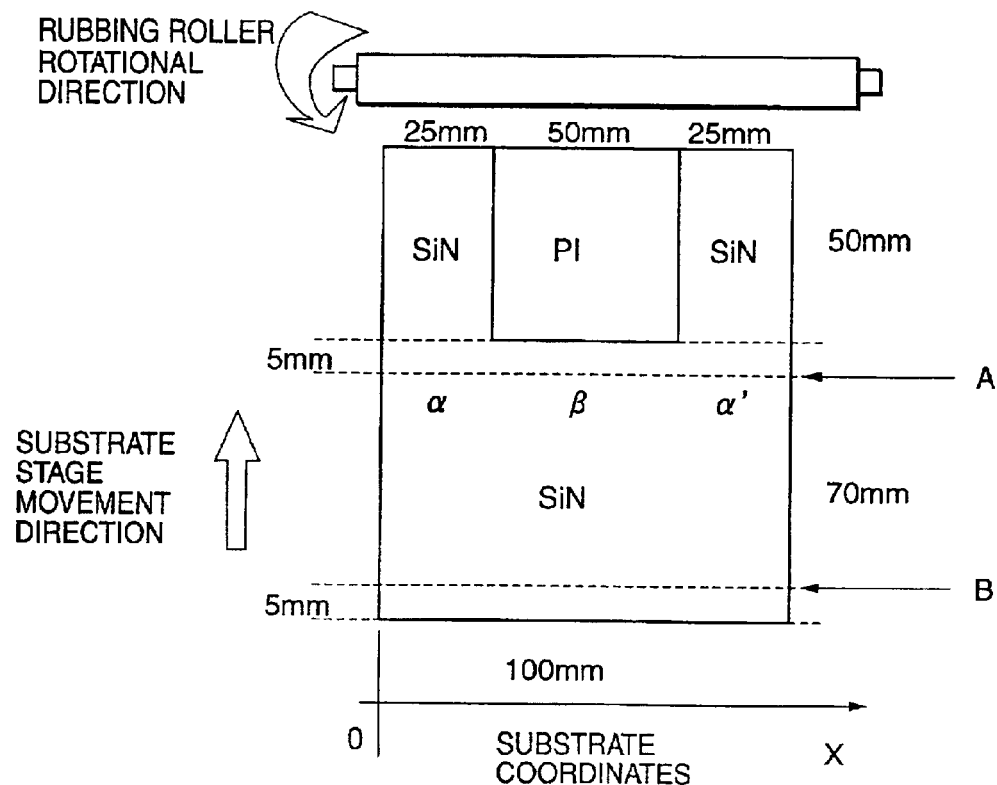
FIG. 4 is a disposition diagram for describing the relationship between a substrate member and a rubbing roller in Example 1.

FIG. 4 shows a substrate member pattern and the position at which the foreign matter adhesion quantity is measured. On a glass substrate of 0.7 mm in thickness, an SiN film of 300 nm in layer thickness was formed and a PI pattern of 50 mm×50 mm was further printed at the part where the substrate member was to come first into contact with the rubbing roller. This substrate member was subjected to rubbing under conditions of pile impression of rubbing cloth of 0.5 mm, a rubbing roller's r.p.m. of 1,500 revolutions and a substrate member feed rate of 50 mm/second.

The substrate member surface having been subjected to rubbing was observed to examine any foreign matter adhering at an area along a dotted line A (position A) in FIG. 4 and an area along a dotted line B (position B) and at their respective areas α, β and α'. Results obtained are shown in FIGS. 5 and 6.

Figure 5:
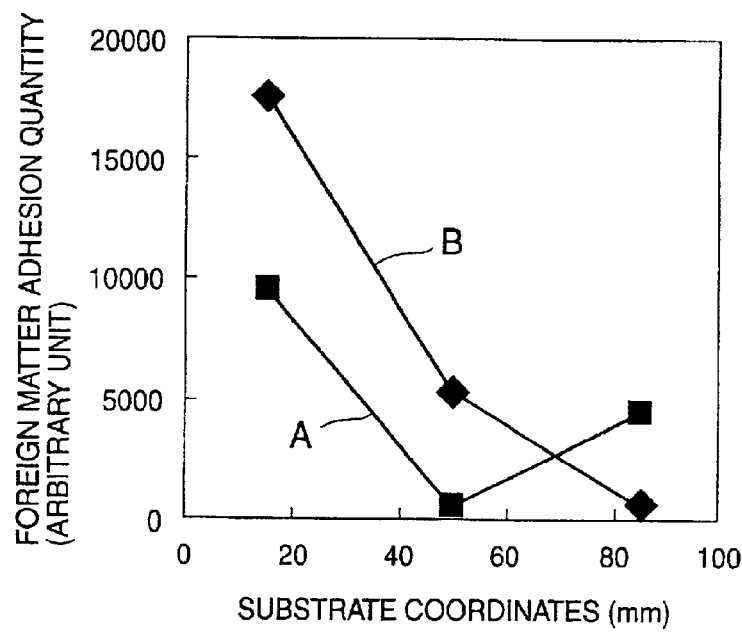
FIG. 5 is a graph showing the quantity of foreign matter adhering to the substrate member surface in Example 1.

FIG. 5 is a graph showing the relationship between coordinates on the substrate member (substrate coordinates) and the foreign matter adhesion quantity. As can be seen from observation with regard to the position A of the substrate member as shown in FIG. 4, the foreign matter adhesion quantity is smaller by one figure to two figures in approximation at the area β of substrate coordinate of 50 mm than at the area α (substrate coordinate of 15 mm) and the area α' (substrate coordinate of 85 mm).

FIG. 6 is a photograph image of the areas α and β shown in FIG. 4. What is dotted in black is the foreign matter having adhered. As the result, the foreign matter stands adhered apparently in a smaller quantity at the area β of substrate coordinate of 50 mm than at the area α of substrate coordinate of 15 mm. Also, the foreign matter adhesion quantity on the PI pattern of 50 mm×50 mm was found to be substantially equal to that at the area β.

On the other hand, the tendency as in the case of the above position A is not seen with regard to the position B on the substrate member. Also, at both the position A and the position B, the foreign matter adhesion quantity is smaller by one figure to two figures in approximation at the area α' of substrate coordinate of 85 mm than at the area α of substrate coordinate of 15 mm. One reason why a great difference is seen in foreign matter adhesion quantity between the area α and the area β is considered to be due to the small coefficient of dynamic friction of the cloth against the PI as shown in FIG. 2, which was so small that the wear level of the cloth was small.

As also shown in FIG. 3, the PI rubbed with the rubbing cloth is negatively charged and the rubbing cloth is positively charged. On the other hand, the SiN rubbed with the rubbing cloth is positively charged and the rubbing cloth is negatively charged. Hence, where the pattern shown in FIG. 4 is subjected to rubbing, the rubbing cloth stands positively charged when the rubbing roller moves from PI to SiN, thus the foreign matter originating from the rubbing cloth and the SiN causes electrostatic repulsion, and the foreign matter is stopped from adhering to the SiN substrate member surface. This is considered to be another reason.

Thus, the quantity of foreign matter adhering to SiN can be controlled by rubbing the PI and the SiN continuously, which have the triboelectric polarity opposite to that of the rubbing cloth.

However, the foreign matter adhesion quantity has not been made controllable with regard to the position B as stated above. This is considered due to the fact that the quantity of triboelectricity decreases relatively soon at the stage the SiN has come into rubbing and hence the effect of having controlled the charging of the cloth during the rubbing of PI is not maintained up to the opposite side of the substrate member.

EXAMPLE 2

Figure 7:
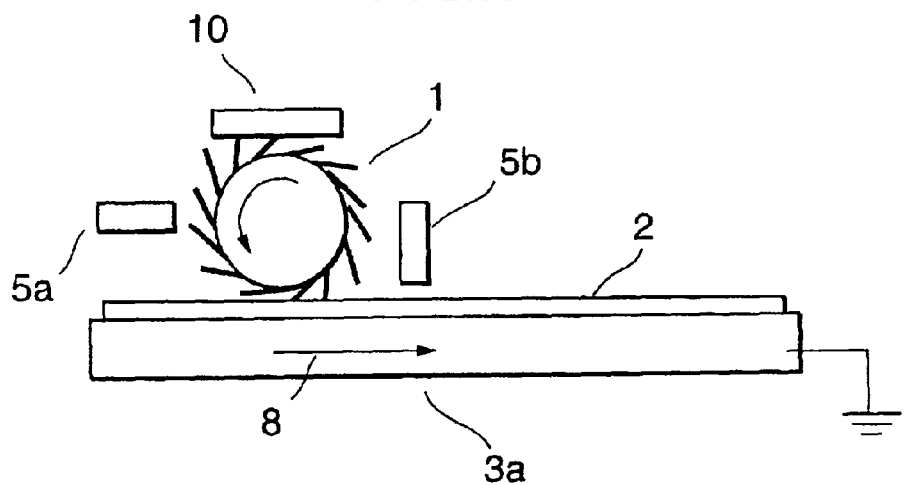
FIG. 7 is a schematic illustration of a rubbing apparatus used in Example 2.

In order to achieve a further improvement concerning the foreign matter adhesion quantity at the position B stated in Example 1, a charge control member shown in FIG. 7 was attached to a rubbing apparatus so that the quantity of triboelectricity on the rubbing roller surface was controlled.

FIG. 7 is a schematic illustration of a rubbing apparatus which has the charge control member. The rubbing apparatus is so constructed that the surface of a film-formed substrate 2 with an alignment film, placed on a stage 3, is rubbed with a rubbing roller 1 being rotated. A surface potentiometer 5a which measures the surface potential of the film-formed substrate 2 (substrate member) is disposed facing the surface of the film-formed substrate 2. A surface potentiometer 5b which measures the surface potential of the rubbing roller 1 is disposed facing the rubbing roller 1. A bar 10 which is the charge control member (hereinafter "charge control bar") is further disposed in contact with the rubbing roller 1.

The rubbing roller 1 comprises a roller to the surface of which a cloth such as nylon, (eg. Yo15N, Yoshikawa Chemical Co., LTD.), rayon (eg. YA-20R, Yoshikawa Chemical Co., LTD) or cotton (eg. HC-25, Hiroki Co.) cloth is fastened. In the apparatus shown in FIG. 7, a method is employed in which the rubbing roller 1 is set stationary and the stage 3 is moved in the direction of an arrow 8. A method may alternatively be employed in which conversely the stage is set stationary and the rubbing roller is moved.

FIG. 7 illustrates that the film-formed substrate 2 is subjected to rubbing with the rubbing roller 1. The stage 3 is grounded so that the stage is always kept at a potential of substantially 0 V. Incidentally, not shown in the drawing, a metallic part of the rubbing roller is grounded so that it is kept at a potential of substantially 0 V. Also, the rubbing cloth is fastened with a double-side adhesive tape to the metallic part, keeping insulation from the metallic part. The potential of the rubbing roller 1 and that of the film-formed substrate 2 immediately after rubbing are always monitored with surface potentiometers 5a and 5b. The charge control bar 10 enables control of the static electricity caused in the rubbing roller 1 by friction. It keeps foreign matter from being caused by the rubbing of the film-formed substrate (substrate member) 2, and consequently can keep the foreign matter from adhering to the substrate member.

The charge control bar 10 is so structured that a stainless steel (SUS304) plate of 3 mm in thickness is coated with a PI varnish (SE-7492, Nissan Chemical Industries, LTD.), which is then baked at 350° C. for about 1.5 hours to provide the plate surface with PI in a layer thickness of about 0.3 mm. Namely, the charge control bar 10 is covered with a material capable of being contact-charged to a polarity different from the potential of the surface of the substrate member. The film-formed substrate 2 is a film-formed substrate (substrate member) comprising a glass substrate of 0.7 mm in thickness and 100 mm×100 mm in area size and an SiN film formed by plasma-assisted CVD in a layer thickness of 300 nm.

First, in the state the charge control bar 10 was not attached to the rubbing apparatus, three SiN film-formed substrates were subjected to rubbing under conditions of pile impression of rubbing cloth of 0.5 mm, a rubbing roller's r.p.m. of 2,000 revolutions and a substrate member feed rate of 50 mm/second. For the purpose of charge elimination of the rubbing roller 1, the charge control bar 10 was attached on lapse of about 2 hours after the above operation was completed, and then three SiN film-formed substrates were subjected to rubbing under the same conditions as the above. When the charge control bar 10 was attached to the rubbing apparatus, its PI side was brought into contact with the cloth of the rubbing roller. Also, the stainless steel plate of the charge control bar 10 was grounded.

Figure 8:
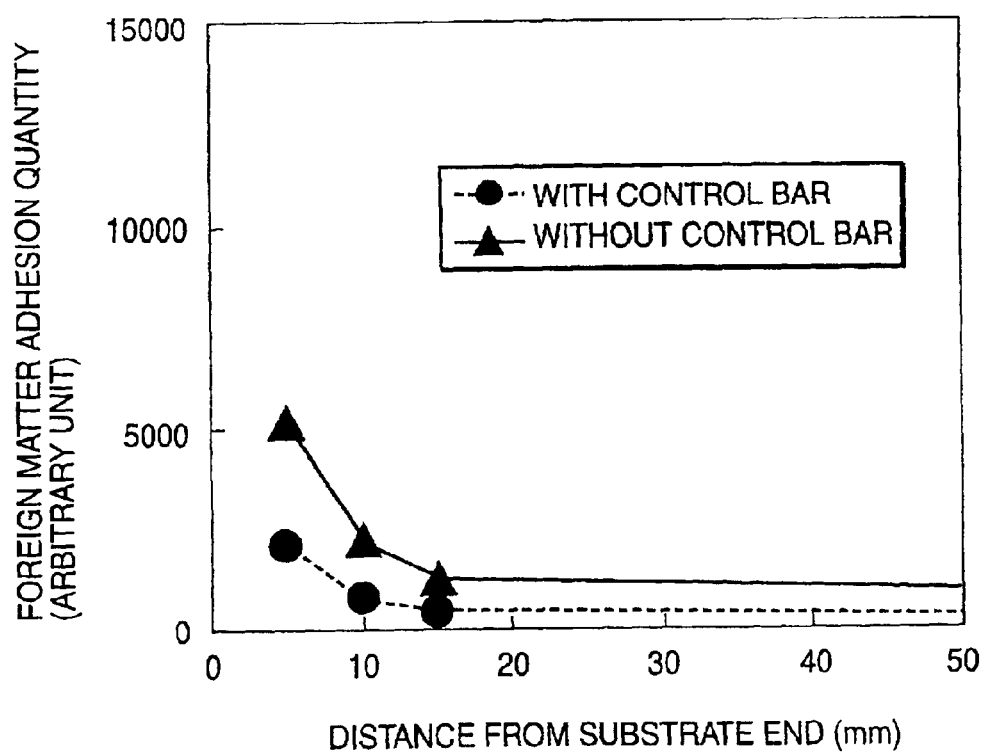
FIG. 8 is a graph showing changes in quantity of foreign matter adhering to the substrate member surface in Example 2.

The quantity of foreign matter having adhered to the substrate member was measured in the same manner as in Example 1 to obtain the results shown in FIG. 8. In FIG. 8, "distance from substrate end" plotted as abscissa corresponds to coordinates given in the direction of relative movement of the rubbing roller, regarding as the origin the substrate position coming first into contact with the rubbing roller. As is apparent from this FIG. 8, the foreign matter adhesion quantity is smaller in the case when the charge control bar is provided than in the case when the charge control bar is not provided, which is from about ½ to about ⅓ of the latter. Bringing the charge control bar 10 into contact with the surface of the rubbing roller 1 enables control of the state of the rubbing roller surface to be charged by triboelectric charging, so that the foreign matter can be kept from adhering to the substrate member.

EXAMPLE 3

In the charge control bar 10 shown in FIG. 7, its position coming into contact with the cloth of the rubbing roller 1 is always fixed, and the charge control bar 10 has a possibility of deterioration as a result of long-time service. Accordingly, for the purpose of making further improvement in this respect, a cylindrical roller 4 for charge control (hereinafter "charge control roller") is attached as a charge control component part of the rubbing apparatus as shown in FIG. 9, which shows its construction schematically.

Figure 9:
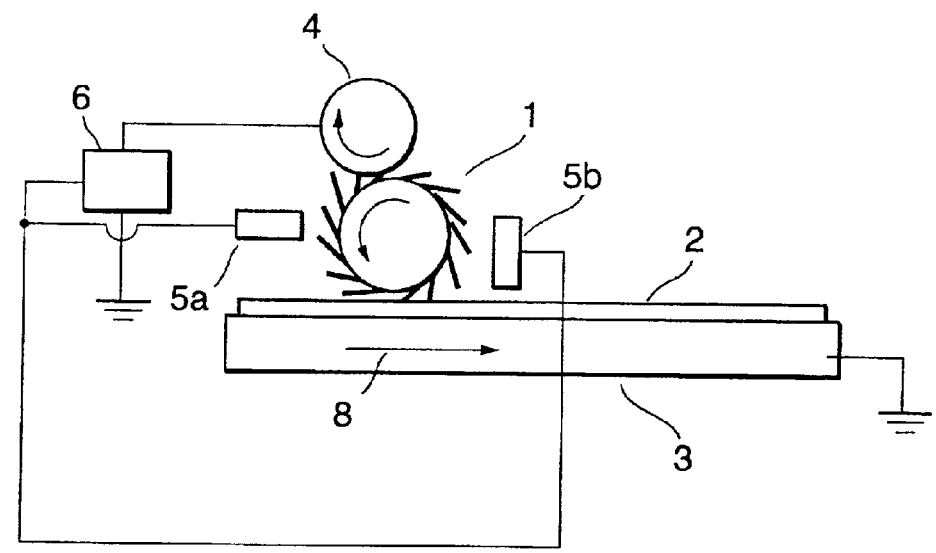
FIG. 9 is a schematic illustration of a rubbing apparatus used in Example 3.

The rubbing apparatus of this Example is, as shown in FIG. 9, so constructed that the surface of a film-formed substrate 2 placed on a stage 3 is rubbed with a rubbing roller 1 being rotated. A surface potentiometer 5a which measures the surface potential of the film-formed substrate 2 (substrate member) is disposed facing the surface of the film-formed substrate 2. A surface potentiometer 5b which measures the surface potential of the rubbing roller 1 is disposed facing the rubbing roller 1. The charge control roller 4 is further provided in contact with the rubbing roller 1 and at the same time a controller 6 which controls the surface potential of the charge control roller 4 is provided. The apparatus is so constructed that the potential applied to the charge control roller 4 is controlled in accordance with values detected by the surface potentiometers 5a and 5b.

The rubbing roller 1 comprises a roller to the surface of which a cloth such as nylon, rayon or cotton cloth is fastened. FIG. 9 illustrates that the film-formed substrate 2 with an alignment film is subjected to rubbing with the rubbing roller 1. In the apparatus shown in this drawing, a method is employed in which the rubbing roller 1 is set stationary and the stage 3 is moved in the direction of an arrow 8. A method may alternatively be employed in which conversely the stage is set stationary and the rubbing roller is moved. The stage 3 is grounded so that the stage is always kept at a potential of substantially 0 V. Also, the rubbing cloth is fastened with a double-side adhesive tape to a metallic part of the rubbing roller, keeping insulation from the metallic part. The controller 6 always monitors with the surface potentiometers 5a and 5b the potential of the rubbing roller 1 and that of the film-formed substrate 2 immediately after rubbing, and applies a feedback to the potential of the charge control roller 4.

In this Example, the charge control roller 4 enables control of the static electricity caused by friction. It keeps foreign matter from being caused by the rubbing of the film-formed substrate (substrate member) 2, and consequently can keep the foreign matter from adhering to the substrate member.

In order to conform the effectiveness of this method, first the charge control roller 4 was prepared. The charge control roller 4 was so structured that a stainless steel (SUS304) roller of 50 mm in diameter was insulated at its rotating shaft and a voltage is directly applicable to the charge control roller itself. Next, a polyimide varnish (JALS-1085, JSR Co.) was spin-coated onto a 5-inch silicon wafer, and this was spinned at 3,500 r.p.m. The resultant wet coating was subjected to drying (leveling) at 80° C. for 4 minutes. The film thus dried was further subjected to heat curing (baking of alignment film) at 220° C. for 1 hour. The alignment film thus formed was in a layer thickness of about 100 nm.

First, in the state the charge control roller 4 was not attached to the rubbing apparatus, three polyimide film-formed silicon wafers were subjected to rubbing under conditions of pile impression of rubbing cloth of 0.3 mm, a rubbing roller's r.p.m. of 520 revolutions and a substrate member feed rate of 25 mm/second. For the purpose of charge elimination of the rubbing roller 1, the charge control roller 4 to which a voltage was directly applicable was attached to the rubbing apparatus on lapse of about 2 hours after the above operation was completed, and a voltage of +2,000 V was applied to the charge control roller 4. Then, three polyimide film-formed silicon wafers were subjected to rubbing under the same conditions as the above. Further, on lapse of about 2 hours, a voltage of −350 V was applied to the charge control roller 4. Immediately after the surface potential of the rubbing roller became stable, polyimide film-formed silicon wafers were subjected to rubbing under the same conditions as the above. Here, as the surface potentiometers 5a and 5b, surface potentiometers Model-344, manufactured by TREK, INC., were used.

Figure 10:
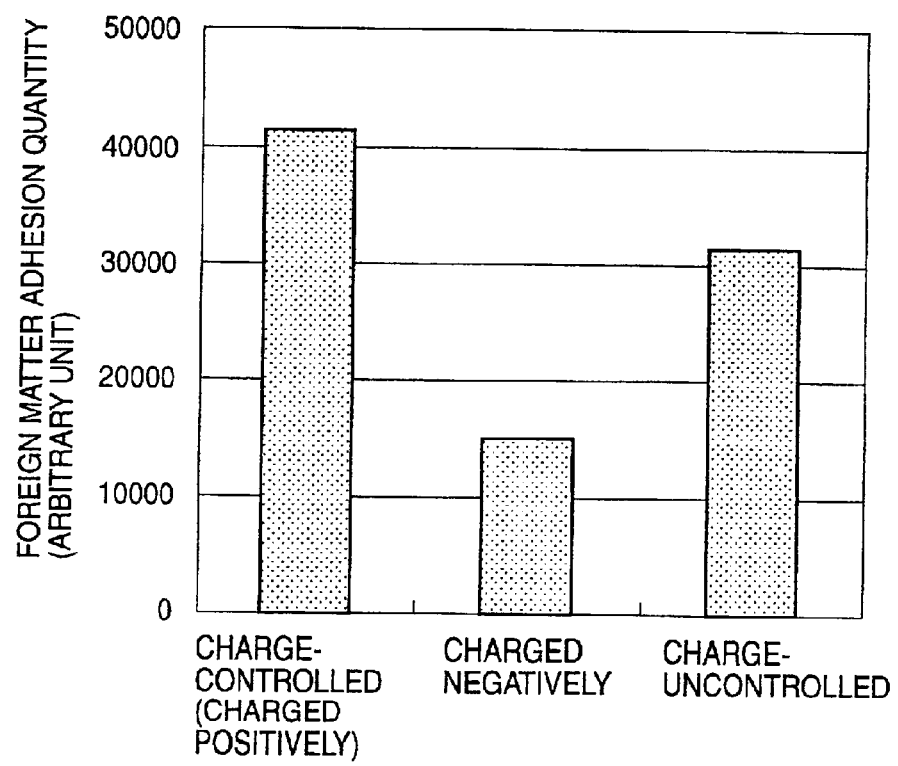
FIG. 10 is a graph showing changes in quantity of foreign matter adhering to the substrate member surface in Example 3.

On the polyimide film-formed silicon wafers 1 (substrate members) having been subjected to rubbing under the above conditions, the quantity of foreign matter having adhered to the substrate members was measured in the same way as Example 1 to obtain the results shown in FIG. 10.

As is apparent from this FIG. 10, the foreign matter adhesion quantity is smaller by about 50% in the case when the charge control roller is negatively charged than in the case when the charge control roller is not provided. On the other hand, the foreign matter adhesion quantity is larger in the case when a positive voltage is applied to the charge control roller than in the case when a negative voltage is applied to the charge control roller. Bringing the charge control roller 4 into contact with the surface of the rubbing roller 1 has proved to enable control of the state of the rubbing roller surface to be charged by triboelectric charging, so that the foreign matter can be kept from adhering to the substrate member.

An experiment further made so that the effect of controlling the foreign matter by the present method is confirmed on actual product substrate members is reported below. To form an alignment film on the film-formed substrate having passed through the TFT step, first a polyimide varnish was printed. After the varnish has been printed, the resultant wet coating was subjected to drying (leveling) at 80° C. for 4 minutes. The film thus dried was further subjected to heat curing (baking of alignment film) at 220° C. for 1 hour. The alignment film thus formed was in a layer thickness of about 100 nm. Next, the alignment film was subjected to rubbing. The rubbing was carried out under conditions of pile impression of rubbing cloth of 0.5 mm, a rubbing roller's r.p.m. of 1,500 revolutions and a substrate member feed rate of 75 mm/second. The charge control roller was attached to the rubbing apparatus, and a positive voltage was applied to the charge control roller.

As the surface potentiometers 5a and 5b shown in FIG. 9, surface potentiometers Model-344, manufactured by TREK, INC., were used. The quantity of triboelectricity produced when the film-formed substrate having the alignment film formed thereon was subjected to rubbing was monitored to obtain the results shown in FIG. 11.

Figure 11:
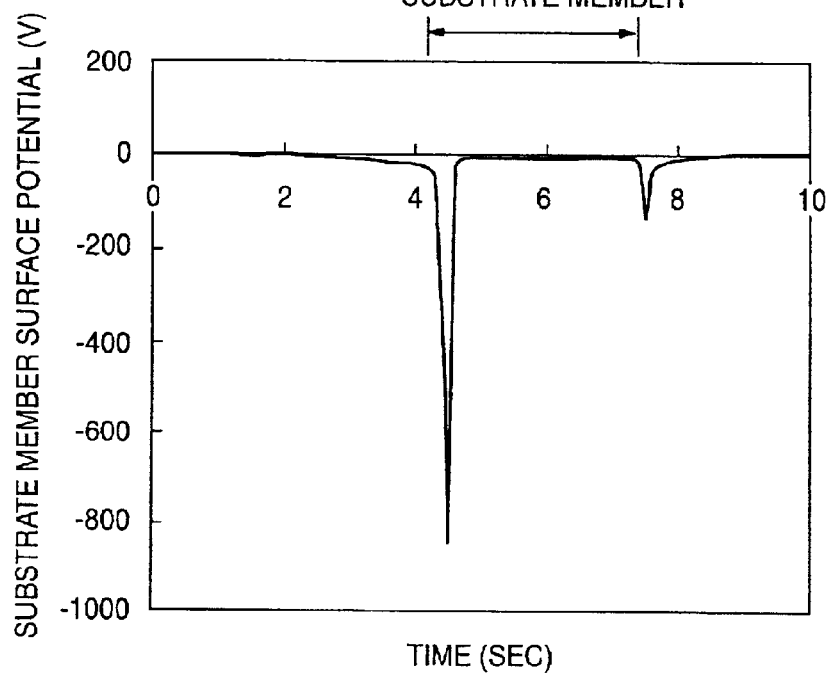
FIG. 11 shows an example of measurement of surface potential of the substrate member surface in Example 3.

FIG. 11 shows the results of measurement of the quantity of triboelectricity of the substrate member subjected to rubbing and passing right beneath the surface potentiometer 5b set stationary. According to FIG. 11, the leading end of the substrate member reaches the part right beneath the surface potentiometer 5b at a point of time where about 4 seconds have lapsed after the start of measurement, and the rear end of the substrate member passes that part at a point of time where about 7 seconds or more have lapsed. The quantity of triboelectricity at the edges of the substrate member is as large as about 850 V and 120 V as absolute value, but the quantity of triboelectricity is smaller than 11 V as absolute value at the middle of the substrate member, which corresponds to the display region surface of the liquid-crystal display element. Therefore, this corresponds to the fact that the adhesion of foreign matter because of static electricity was avoidable. Also, the foreign matter was removable with ease in the post-rubbing cleaning step.

Figure 12:
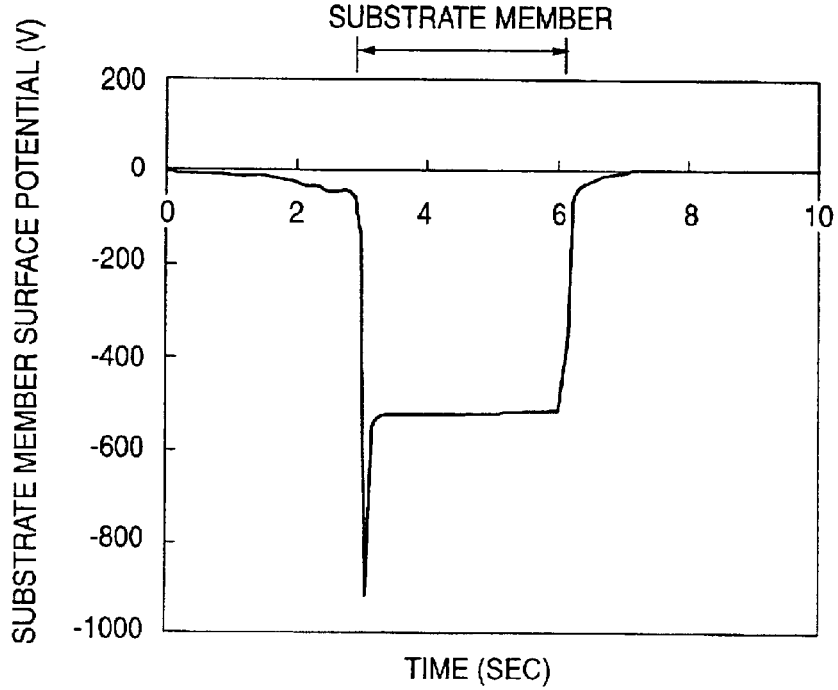
FIG. 12 shows an example of measurement of surface potential of the substrate member surface in a conventional method.

For comparison, the quantity of triboelectricity produced when the film-formed substrate having the alignment film formed thereon was subjected to rubbing in the state the charge control roller 4 shown in FIG. 9 was detached was monitored to obtain the results shown in FIG. 12. According to the results, the quantity of triboelectricity at the edge of the substrate member is about −920 V, showing a large value. Also, the quantity of triboelectricity is as very large as about 520 V as absolute value at the middle of the substrate member, which corresponds to the display region surface of the liquid-crystal display element. In such a large quantity of triboelectricity, the adhesion of foreign matter because of static electricity tends to occur, and the foreign matter is removable with difficulty also in the post-rubbing cleaning step.

In this Example, the number of foreign matter on the substrate member after the post-rubbing cleaning step was finished was measured in respect of foreign matter having adhered in a size of 5 μm or larger in diameter which might affect the gap between substrates of liquid-crystal display elements. In the case of the substrate member on which the measurement shown in FIG. 11 was made, the foreign matter was in the number of $0.001/mm^2$ on the average. In the case of the substrate member on which the measurement shown in FIG. 12 was made, the foreign matter was in the number of as large as $259/mm^2$ on the average, and the foreign matter was judged to stand adhered because of remaining static electricity.

In this Example, the potential of the rubbing roller is controlled by bringing the potential-controlling roller into contact with the rubbing cloth surface of the rubbing roller 1. Instead, also usable are a method of controlling the potential of the rubbing roller in non-contact, and a method of controlling the potential of the rubbing roller itself by means of a variable-voltage power source. Also, in this Example, the potential is so controlled that the difference in potential between the substrate member having been subjected to rubbing and the rubbing roller is about 0 V. Instead, also usable is a method in which the static repulsion is utilized, setting the potential of the rubbing roller and the potential of the substrate member to have the same polarity (e.g., when the potential of the rubbing roller is positive, the potential of the substrate member is also positive).

In Example 3, described is an example in which, using as the film-formed substrate 2 the substrate on which an SiN passivation film has been formed, its SiN film is subjected to rubbing. In the structure in which an alignment film formed of PI in a stated pattern is disposed on an SiN film provided on the surface of a glass substrate, there may arise a problem that the foreign matter adheres to the protective film at its part on the outside of the edges of the alignment film and this foreign matter is transferred onto the PI alignment film. However, the both films of the SiN passivation film and the PI alignment film can be kept from being statically charged, by reversing the potential applied to the charge control roller 4 at the point where the rubbing shifts from the SiN passivation film to the PI alignment film or at the point where the rubbing shifts from the PI alignment film to the SiN passivation film. Thus, the foreign matter can be made to less adhere.

In Examples 1 to 3, described are examples in which the SiN film is used as a passivation film and the PI film as an alignment film. Without limitation to such materials, the present invention is applicable to protective films and alignment films formed of any materials.

Next, the rubbing method described above is applied in the manufacture of liquid-crystal display devices, whereby liquid-crystal display devices having superior display quality can be formed. Stated specifically, the alignment film is formed above a thin-film transistor layer comprising a glass substrate on which TFT elements and electrodes and wirings for driving the TFT elements, to prepare a transistor substrate member. Meanwhile, an opposing electrode having another alignment film is formed above color-filter layers formed correspondingly to the TFT elements, to prepare a color-filter substrate member. After the surface of each of the above alignment films is subjected to rubbing by the rubbing method described in Examples 1 to 3, the transistor substrate member and the color-filter substrate member are opposingly disposed, and the space between them is filled with liquid crystal, thus a liquid-crystal display element is completed.

To the alignment film in the above liquid-crystal display device, the foreign matter that may otherwise be produced by conventional rubbing treatment has been made to little adhere. Hence, when the liquid-crystal display device is dynamically operated, the alignment film can exhibit superior display quality and performance without any defects ascribable to the foreign matter.

According to the present invention, a liquid-crystal display element can be obtained in which the foreign matter to be produced when the alignment film is subjected to rubbing has been kept from adhering to the alignment film surface because of static electricity, to afford superior display quality.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

We claim:

1. A method of manufacturing a liquid-crystal display element, the method comprising:
    a rubbing step of bringing a rubbing cloth provided on the surface of a rubbing roller into contact with an alignment film formed on the surface of a substrate member to subject the alignment film to rubbing;
    wherein said rubbing step is feedback-controlled in accordance with a measured value obtained by measuring the surface potential of said rubbing cloth and the surface potential of said alignment film so that the surface potential of said rubbing cloth has the same polarity as the surface potential of said alignment film when said rubbing cloth comes into contact with the surface of the alignment film.

2. A liquid-crystal display device comprising the liquid-crystal display element manufactured by the method according to claim 1.

* * * * *